UNITED STATES PATENT OFFICE.

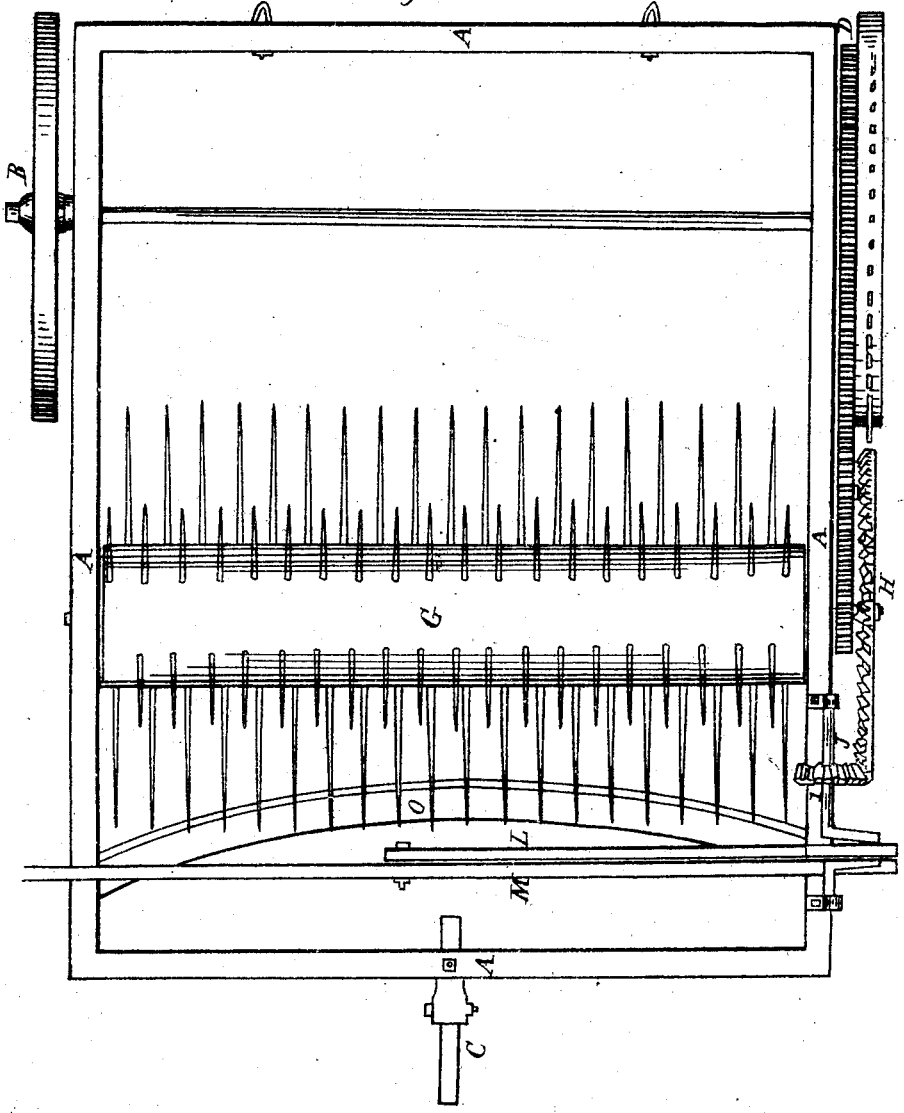

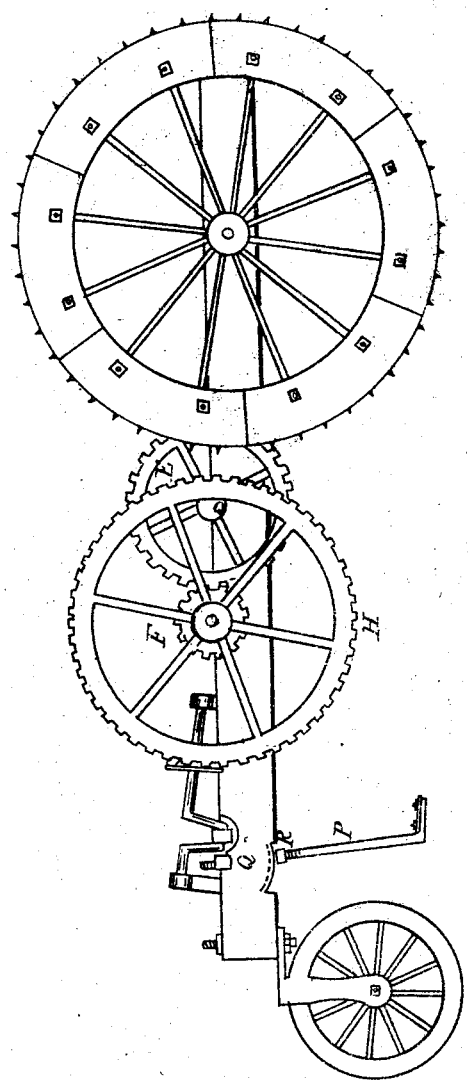

DAVID LEWIS, JR., OF BERN, NEW YORK.

IMPROVEMENT IN MACHINES FOR MOWING AND CUTTING GRASS AND GRAIN.

Specification forming part of Letters Patent No. 692, dated April 14, 1838.

*To all whom it may concern:*

Be it known that I, DAVID LEWIS, Jr., of the town of Bern, in the county of Albany and State of New York, have invented a new and Improved Mode of Mowing Grass and Cutting Grain by Animal Power, of which the following is a full and accurate description.

My said invention consists in the construction and use of a machine of the following form and principle: The frame which sustains the machinery is of timber, and is of an oblong form in size—say ten by eight feet—and the timbers three inches thick by seven inches deep, and is marked in the Drawing No. 1 A A A A. This frame is sustained at the forward end by two strong wheels, marked B B, which are about four feet six inches (more or less) in diameter. Under the center of the hind end is a steering or caster wheel, which is marked C in both drawings, which wheel revolves between two straps of iron turning in form of a crank at the upper end, and terminating in a strong swivel, which traverses on a screw-bolt, which passes up through the frame with a nut on the under side and another on the top of the frame, by which the said end of the frame can be raised or lowered as occasion may require. On one of the forward wheels—say that on the right hand—is a segment spur-wheel on the side next the frame, the edge of which is seen in No. 1, marked D, which segment-wheel may be about four feet diameter, and the fellies of the supporting-wheel on that side are of sufficient depth to receive and support it. Immediately behind this wheel is another spur-wheel of corresponding gear, and about two feet diameter, marked E in Drawing No. 2, which wheel operates a pinion on its opposite or back side of about nine inches diameter, which pinion is marked F. The pinion last specified is on the outer end of the shaft or axle of the cylinder-rake G, which is thereby made to revolve with said pinion. On the same shaft and on the outer side of said pinion is a bevel-wheel of three feet six inches (more or less) in diameter, facing inward toward the frame marked H in both drawings. This wheel operates a bevel-pinion, (marked I in Drawing No. 1,) which pinion is on the crank-shaft J. This crank has a sweep six inches each way, and carries with it the outer end of the pitman L, the other end of which is attached to the upper traverse-bar M, which operates the scythe. The scythe marked O is underneath the traverse-bar. at a proper distance from the ground, and is attached to said bars by two bars or rods of iron projecting downward, as seen at P, No. 2, the bottoms of which bars turn forward at the proper angle to receive the ends of the scythe thereon, where it is fastened with proper bolts, and the upper ends of said rods pass upward through the traverse-bars, and having a nut screwed on the top of said bars, another on the bottom, the scythe is by means of said nuts raised or lowered as occasion may require. On the periphery of the right-hand forward wheel are spikes or corks which enter the ground as the machine is drawn forward and prevent its slipping, and the segment-wheel attached to it turns the center wheel, E, which turns the pinion F, and with it the cylinder rake or comb, the teeth of which, passing backward through the grass toward the scythe, not only straighten and clear it preparatory to its meeting the scythe, but incline it backward so that the scythe can take better hold of it. The bevel-wheel, at the same time turning the bevel-pinion, as already specified, carries the scythe horizontally each way with a quick action and reaction, and produces the effect required of cutting the grass and leaving it spread behind.

The scythe may be made in the following form—say seven feet in length, about four inches wide, smooth on the upper and lower side, with the back of the under side rounded off a little, crowning in front, each end turning back, and the edge or the crowning or front to continue round each end, with two holes through near each end to receive the small bolts that pass through the feet of the bolts that proceed down through the traverse-bars, as seen at P, Drawing No. 2, the hind wheel traversing in the manner already described. Like the caster on the foot of a piece of furniture, the machine will be at liberty to turn in any direction. The traverse-bars are coupled together at the proper distance by any suitable contrivance, one resting in a proper score, another on the top of the frame at each side, and the other under it, as shown, by the ends at R in No. 2. It may have friction-rollers to ease and facilitate its motion. When the scythe is to be sharpened, the lower traverse-bar is carried back, as shown by the dotted lines at Q in Drawing No. 2, the top bar serving as pivot, and when so carried back is whetted from the back side, and when carried forward again to the place of operation it is kept there by a button, pin, or any suitable application.

The points I claim as my invention are—

1. The particular structure of the traverse-bars and manner of sustaining and operating the scythe in the manner herein described.

2. The revolving comb or straightener preceding the scythe and preparing the grass for its operation, in combination with the scythe, constructed and operating as herein described.

3. The hind or caster wheel, in combination, as herein described, by which the hinder end of the machine can be raised or lowered at pleasure.

In testimony whereof I, the said DAVID LEWIS, have subscribed my name, in presence of the witnesses whose names are hereunto subscribed, on the 12th day of March, A. D. 1838.

DAVID LEWIS, JR.

In presence of—
 MOSES PATTEN,
 BENJAMIN V. PARDNER.